United States Patent
Friesen

(10) Patent No.: US 8,567,123 B2
(45) Date of Patent: Oct. 29, 2013

(54) WATER WICK POT

(75) Inventor: John Friesen, Leamington (CA)

(73) Assignee: Tug Weld Manufacturing, Leamington, Ontario (CA)

( * ) Notice: Subject to any disclaimer, the term of this patent is extended or adjusted under 35 U.S.C. 154(b) by 0 days.

(21) Appl. No.: 13/084,163

(22) Filed: Apr. 11, 2011

(65) Prior Publication Data

US 2011/0247271 A1 Oct. 13, 2011

Related U.S. Application Data

(60) Provisional application No. 61/322,345, filed on Apr. 9, 2010.

(51) Int. Cl.
*A01G 25/00* (2006.01)

(52) U.S. Cl.
USPC .............................................. 47/81; 47/66.1

(58) Field of Classification Search
USPC .......... 47/65.5, 66.1, 66.6, 79, 80, 81, 82, 87, 47/40.5, 48.5
See application file for complete search history.

(56) References Cited

U.S. PATENT DOCUMENTS

| 2,802,305 | A | * | 8/1957 | MacNaughton | 47/81 |
| 3,069,807 | A | * | 12/1962 | Wall | 47/81 |
| 4,070,794 | A | * | 1/1978 | Gibbs | 47/79 |
| 4,115,951 | A | * | 9/1978 | Becker et al. | 47/81 |
| 4,782,627 | A | * | 11/1988 | Hauk | 47/81 |
| 4,961,285 | A | * | 10/1990 | Jenkins et al. | 47/79 |
| 5,446,994 | A | * | 9/1995 | Chou | 47/81 |
| 6,418,663 | B1 | * | 7/2002 | Smith | 47/79 |
| 2004/0148856 | A1 | * | 8/2004 | Sawyer | 47/81 |

* cited by examiner

*Primary Examiner* — Rob Swiatek
*Assistant Examiner* — Lisa Tsang
(74) *Attorney, Agent, or Firm* — Carlson, Gaskey & Olds, P.C.

(57) ABSTRACT

A pot including a sump and water wick assembly for providing water to a plant supported within the pot is disclosed. The sump includes an inner diameter that corresponds to the inner diameter of the pot. The sump is disposed about an outer perimeter of the pot and includes the water wick that extends into the pot and soil supporting a plant. The pot assembly includes an edge with a curved surface to provide desired appearance that nests within corresponding features of a second identical pot to aid in stacking many example pots for shipment and display.

12 Claims, 5 Drawing Sheets

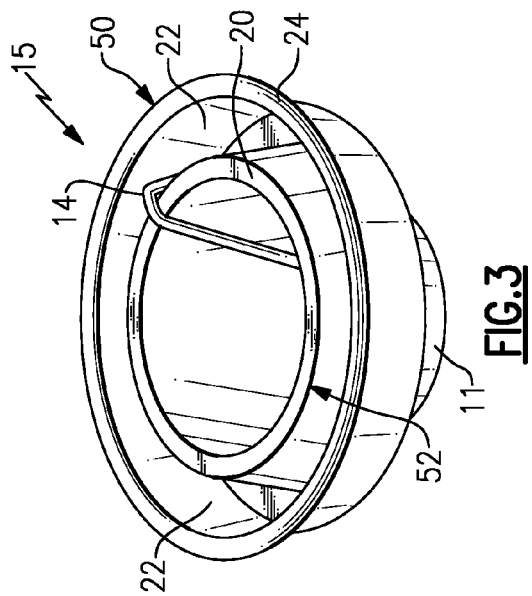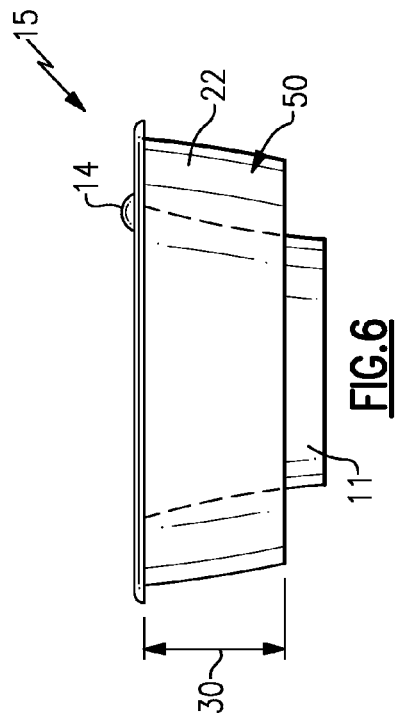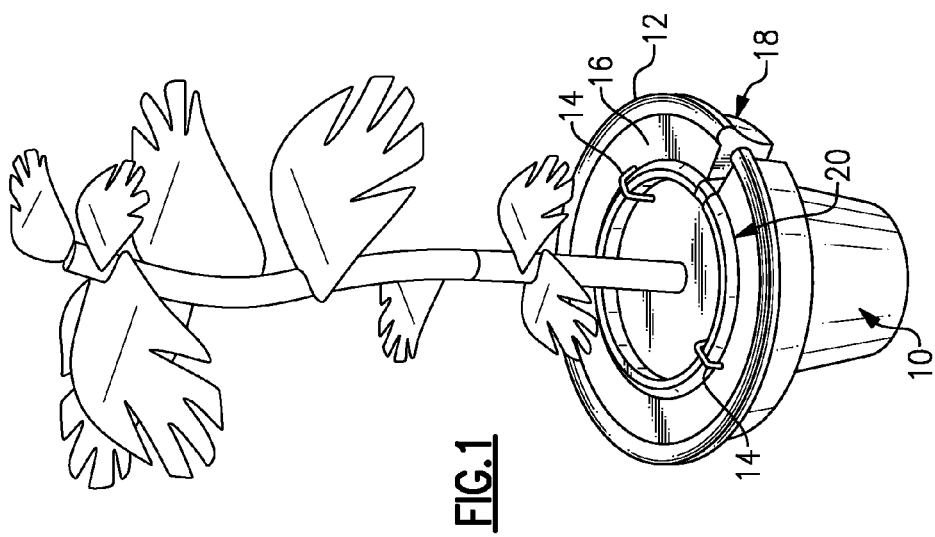

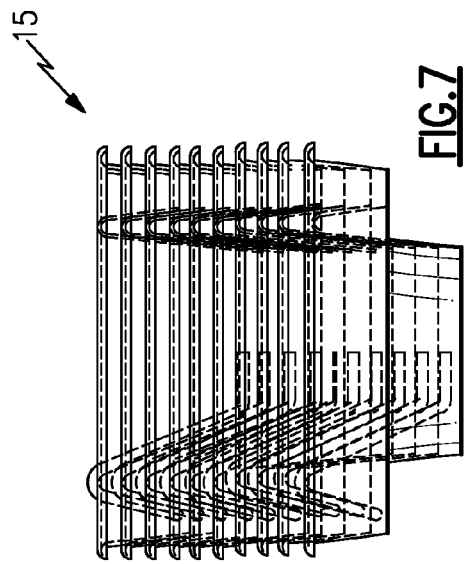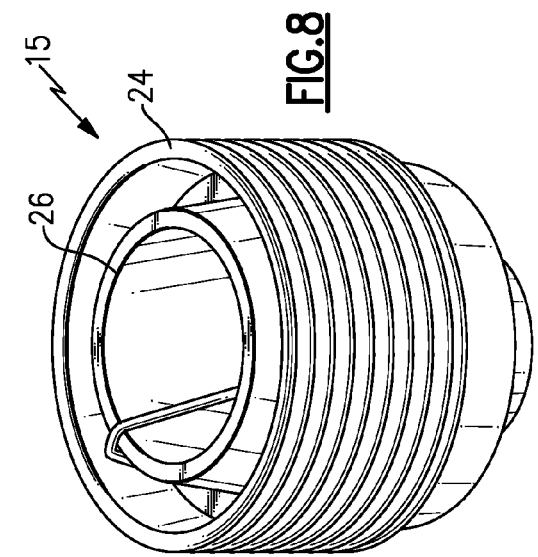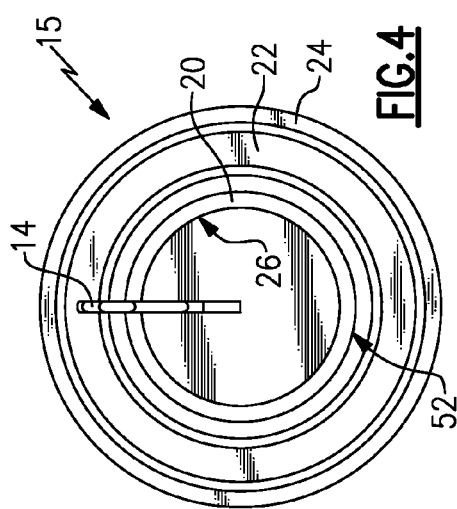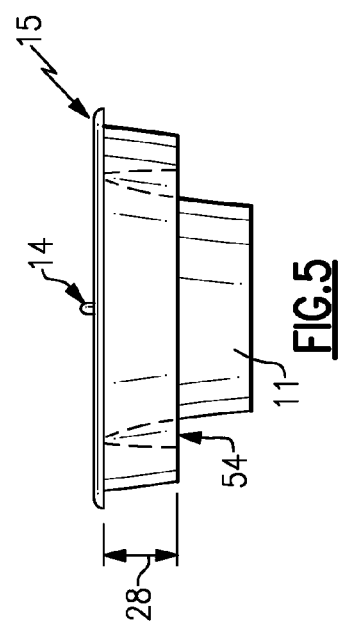

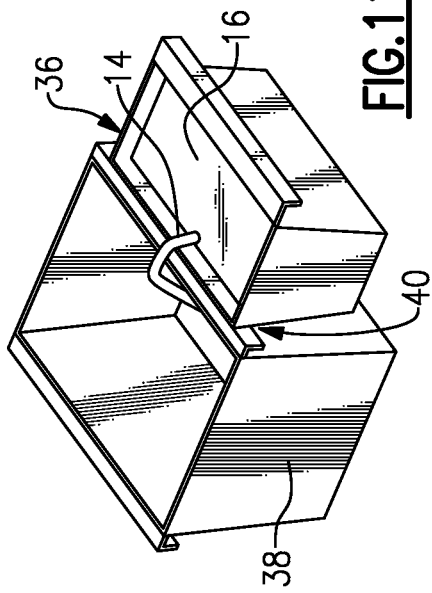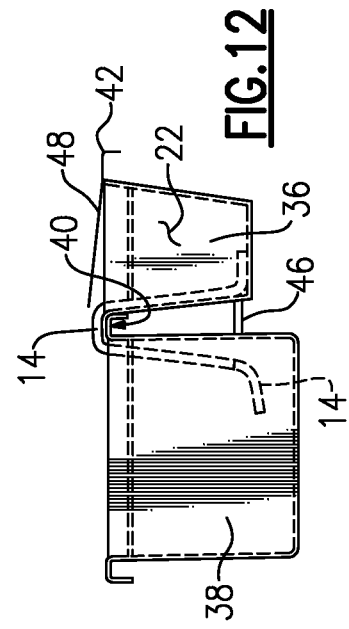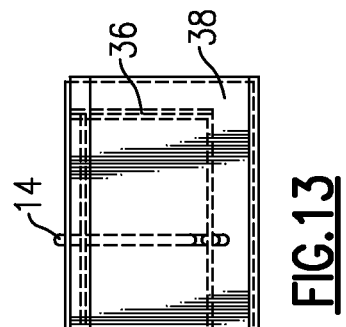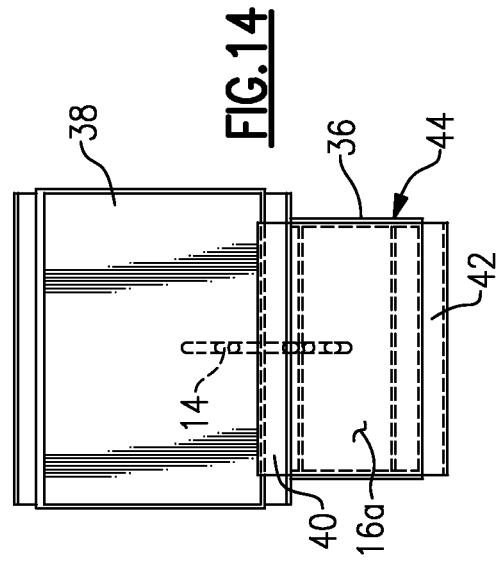

US 8,567,123 B2

WATER WICK POT

CROSS-REFERENCE TO RELATED APPLICATIONS

This application claims priority to U.S. Provisional Application No. 61/322,345, filed Apr. 9, 2010.

BACKGROUND

This disclosure generally relates to water wicking devices that provide water to potted plants on an as needed basis. More particularly, this disclosure relates to a both pots including water wicking devices and water wicking devices that mount to existing pots.

SUMMARY

A disclosed example pot includes an integrally formed water wick assembly that is integrally formed as part of the pot. A sump is disposed about an outer perimeter of the pot and includes a water wick that extends into the pot and soil supporting a plant. The example pot assembly includes an edge with a curved surface to provide a desired appearance that nests within corresponding features of a second identical pot to aid in stacking many example pots for shipment and display.

Another disclosed sump includes a channel that fits about a perimeter of a pot. A lip fits over an edge of a pot to support the sump. The sump extends substantially about the pot and includes a slot to facilitate mounting to a pot already including a plant.

BRIEF DESCRIPTION OF THE DRAWINGS

FIG. 1 is a perspective view of an example plant and pot including an example clip water wick assembly.

FIG. 3 is a perspective view of an example pot with an integral water wick assembly.

FIG. 4 is a top view of the example pot with an integral water wick assembly.

FIG. 5 is a side view of the example pot with the integral water wick assembly.

FIG. 6 is another example pot with the integral water wick assembly including a deeper sump.

FIG. 7 is a cross-sectional view of many pots with the integral water wick assemblies stacked.

FIG. 8 is a perspective view of the water wick assemblies stacked on top of each other.

FIG. 11 is perspective view of another water wick assembly including rectangular sump.

FIG. 12 is a cross-sectional view of the example water wick assembly of FIG. 11.

FIG. 13 is a side view of the example water wick assembly of FIG. 11.

FIG. 14 is a top view of the example water wick assembly of FIG. 11.

DETAILED DESCRIPTION

Figure 2:
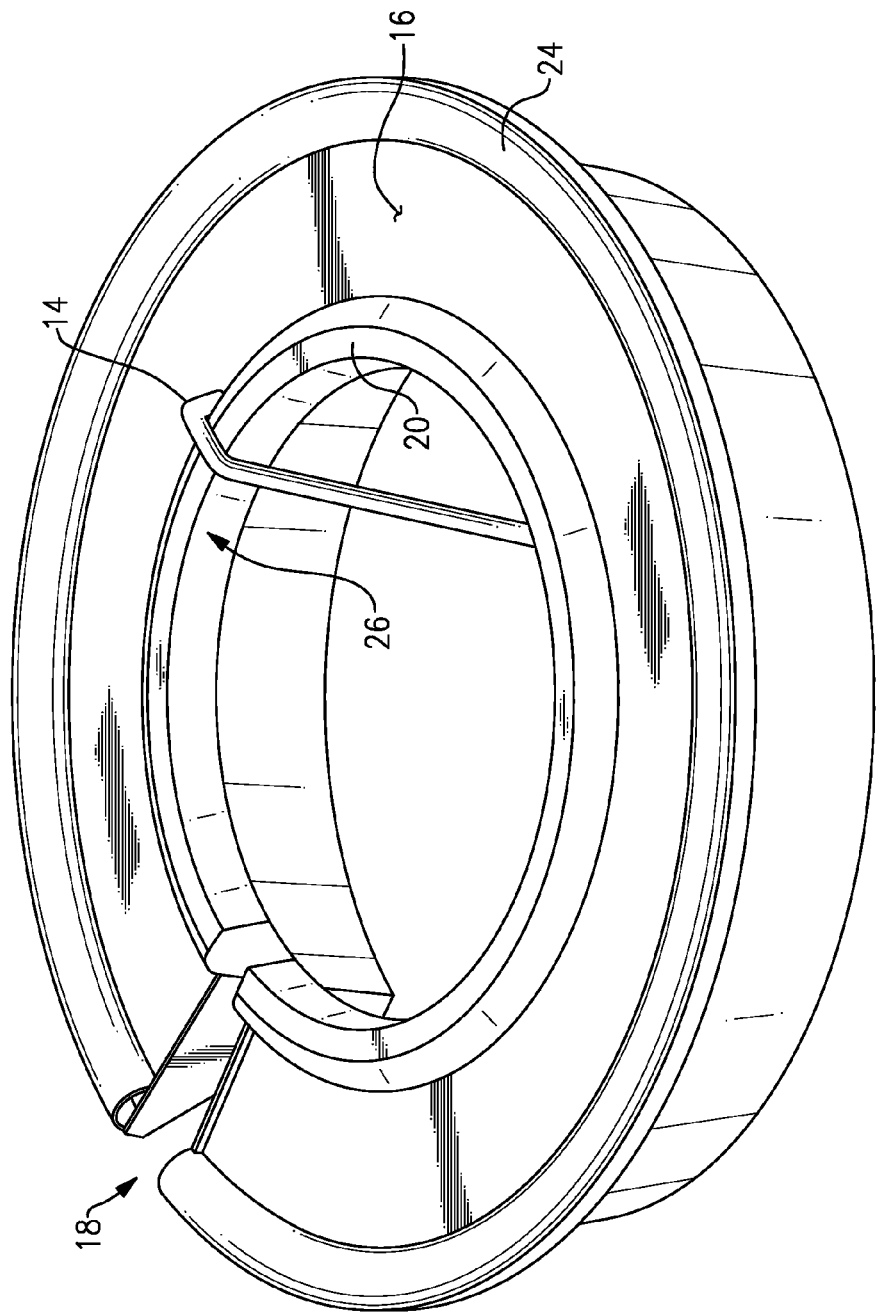
FIG. 2 is an enlarged view of the example water wick assembly.

Referring to FIGS. 1 and 2, a plant is mounted within soil held within a pot 10. The plant requires a certain amount of water and moisture to maintain a desired appearance and health. In some instances, especially for indoor plants, no one may be available to provide the periodic watering that the plant requires. Moreover, over watering of the plant can also harm the plant such that simply dumping an excessive amount of water into the pot is not a desirable alternative to extended periods without water.

The example pot 10 includes a water wick assembly 12 that is clipped onto an edge of the pot 10 and filled with water. The water wick assembly 12 includes a water wick 14 that extends into the soil of the plant within the pot 10 and also extends into sump 16 defined by the water wick assembly 12. Water within the sump 16 wicks through the water wick 14 into the soil. The demand for water by the plant draws water through the wick 14 and into the soil to maintain a desired level of moisture within the plant soil. Accordingly, the soil is provided with water on an as needed basis depending on the moisture content of the soil. In other words, as the soil dries, an increased amount of water is drawn from the sump 16 and into the soil. In this example, only one water wick 14 is shown, however additional water wicks 14 could be utilized to provide the desired amount of moisture to the soil and plant. Once the moisture level within the soil reaches a desired level, the draw of moisture is slowed. In this way the example water wick assembly 12 provides the water required by the plant without overexposure to water.

The shape of the sump 16 is defined by inner and outer diameters 26, 24 and includes a split 18. The split 18 provides for installation of the water wick assembly 12 around a plant already within the pot 10. As appreciated, a continuous ring would require installation by moving the water wick assembly 12 over the plant. This may be difficult and undesirable in some instances. Accordingly, the split 18 allows the sump 16 to be spread such that it may be mounted to the pot 10 without having to be assembled over the plant.

Moreover, pots come in an infinite number of sizes such that one size of water wick assembly could not conform to all by a few sizes of pot. The split 18 provides a tolerance such that the sump 16 can spread apart to accommodate pots of many different sizes.

Referring to FIGS. 3, 4 and 5, an example pot 15 that includes an integrally formed water wick assembly 50 that includes an inner diameter 20 that corresponds to the inner diameter of the pot 11. An outer diameter 24 of the water wick assembly 50 includes an edge 52 with a curved surface to provide desired appearance and to aid in stacking many example pots 15 for shipment and display. In this example the edge 52 fits within an annular groove 54 that is disposed on an underside of the water wick assembly 50 between an outer wall of the pot 11 and the water wick assembly 50 (Best shown in FIG. 5).

In this example, one wick 14 is shown, however, as is shown in FIG. 1, many wicks 14 can be utilized to draw water from within the sump into the soil. The wick 14 is formed of a material that provides for fluid flow from a cavity 22 of the sump 16 to the plant soil in response to a moisture content of the soil. In other words, the wick draws water from the sump 16 on a demand basis depending on a moisture content of the soil.

Referring to FIG. 6, another example sump 16 is shown that includes a depth 30 greater than the depth 28 (FIG. 5) of the example disclosed in FIGS. 1-5. The sump 16 may be of any depth as is illustrated such that more or less water can be kept. As appreciated, the depth 30 can extend to the entire height of the pot 11. Accordingly, the depth is limited only by the pot size and the desired amount of water to be stored in the sump 16.

Referring to FIGS. 7 and 8, the example water wicking pot assemblies 15 are formed to be stackable. As appreciated, stacking the water wick pot assemblies 15 provides for more favorable storage and shipping. The configuration of the example water wick pot assembly 15 includes angled surfaces that provide for the stackability of the water wick assembly 12. Moreover, each of the water wick pot assemblies 15 fit within corresponding features, such as for example the outer diameter 24 includes the top curved edge surface 52 that nests within the bottom annular groove portion 54. Moreover, the curved surface of another water wick assembly 12 fits within corresponding portion of another water wick pot assembly 15 to further facilitate efficient and convenient stacks.

Figure 10:
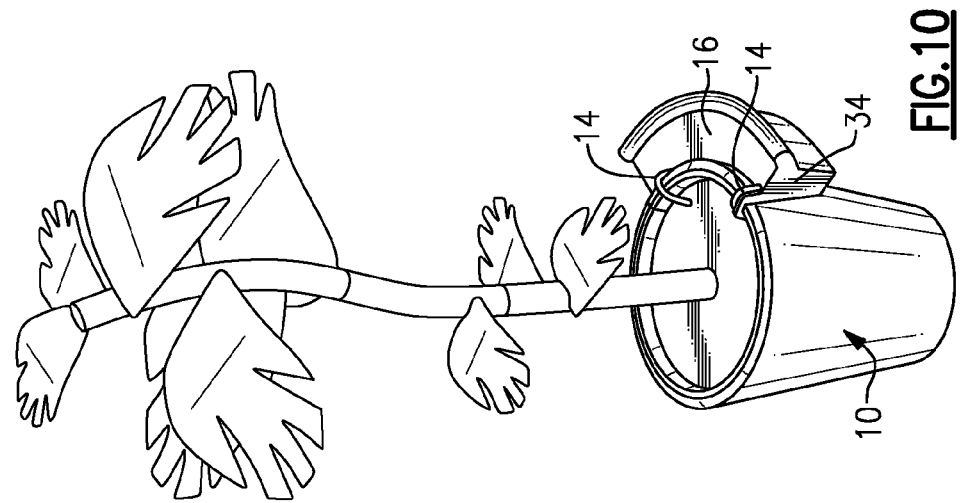
FIG. 10 is a perspective view of the example water wick assembly shown in FIG. 10.
Figure 9:
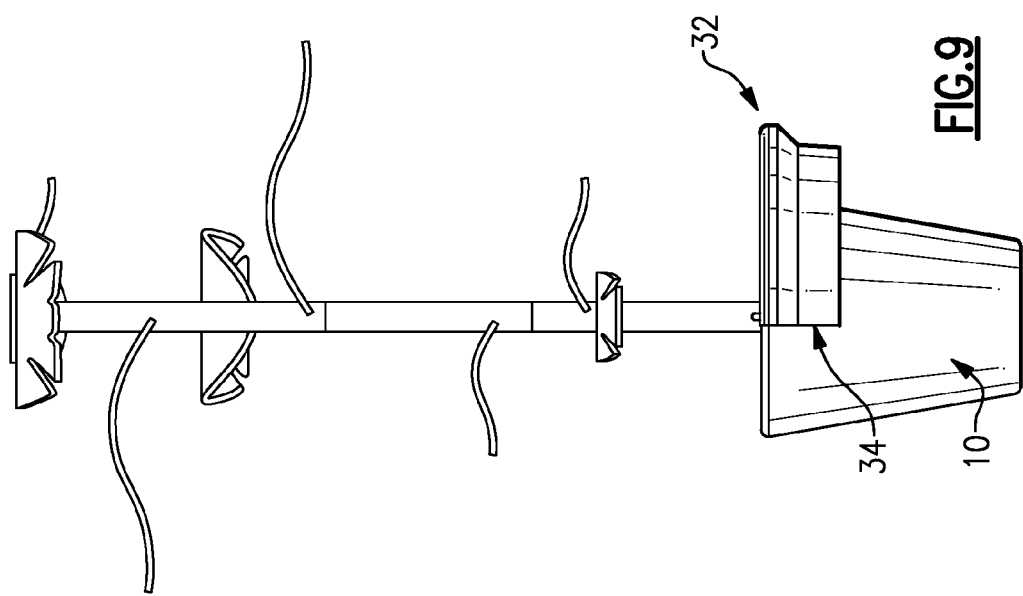
FIG. 9 is a side view of another example water wick assembly.

Referring to FIGS. 9 and 10, another example water wicking assembly 32 includes ends 34 and extends only partially about the circumference of the pot 10. In this example only a limited circumferential section is provided as the sump 16. This configuration includes the same clip 20 configuration on an inner diameter 26 that engages an edge of the pot 10. This smaller, limited circumferential section provides for mounting to pots 10 of an even greater range of sizes. In other words, the smaller circumferential length provides for mounting to pots of larger or smaller sizes. The smaller circumferential length also provides for placement of the sump 16 in a position that is less visible. In some instances it may be desirable to conceal the sump 16 from view. Accordingly, the smaller circumferential sump 16 allows for the positioning in a less visible side of the pot 10.

Referring to FIGS. 11-14, another example water wick assembly 36 is rectangular in shape and is adapted to pot 38 that have flat sides. As appreciated, plant pots come in wide range of shapes and sizes. The example water wick assembly 36 therefore includes a rectangular sump 16 that includes cavity 22 for water. The example sump includes ends 44 that close off and define the cavity 22. A clip 40 is provided for attachment to the edge of the pot 38. The wick 14 is in fluid communication with water in the sump 16 and the plant soil. In this example, an additional support 46 is (FIG. 12) provided to maintain the orientation of the sump 16 relative to the pot 38. As appreciated, a similar support 46 could be utilized for the round water wick assemblies discussed hereinabove.

The example water wicking assembly 36 includes a lid 48 that is movable between an open position to allow addition of water and a closed position that prevents the accumulation of debris within the cavity 22. Moreover, the lid 48 slows evaporation of water from the cavity 22. The lid 48 includes slots for the wicks 14 such that the lid may close sufficiently as is desired. Moreover, although specific shapes of water wick assemblies have been disclosed by way of example, other shapes and sizes are within the contemplation and scope of this disclosure. In addition, the example water wick pots and assemblies could be utilized as a hanging pot, or with existing hanging pots.

Although an example embodiment has been disclosed, a worker of ordinary skill in this art would recognize that certain modifications would come within the scope of this disclosure.

What is claimed is:

1. A nestable pot assembly for supporting growth of a plant comprising:

a first cavity for holding soil that supports growth of a plant;
a sump for storing water;
an edge disposed between the first cavity and the sump;
an annular groove disposed between the first cavity and a bottom side of the sump, the annular groove spacing the sump away from the first cavity and configured to enable a second pot to nest within a first pot, the annular groove capable of receiving an edge of the second pot between the first cavity and the sump; and
a wick extendable from the first cavity into the sump for communicating water from the sump into the first cavity, the first cavity holding soil that supports growth of the plant.

2. The pot assembly as recited in claim 1, wherein the sump is defined entirely about an outer perimeter of the first cavity.

3. The pot assembly as recited in claim 2, wherein the first cavity and the sump include a depth, with the first cavity having a greater depth than the sump.

4. The pot assembly as recited in claim 2, wherein the sump comprises an annular chamber having a circumferential width continuous about the outer perimeter of the first cavity.

5. The pot assembly as recited in claim 1, wherein the wick extends from a bottom surface of the first cavity to a bottom surface of the sump.

6. The pot assembly as recited in claim 1, wherein an outer surface of the first cavity and an outer surface of the sump correspond with an inner surface of the first cavity and an inner surface of the sump of a second pot assembly such that the pot assembly is nestable within the second pot assembly.

7. The pot assembly as recited in claim 6, wherein the outer surface of the first cavity is tapered such that the first cavity comprises a width that decreases in a direction toward a bottom surface of the pot assembly.

8. The pot assembly as recited in claim 1, including a lid covering the sump.

9. A nestable pot for supporting growth of a plant comprising:
a central cavity for holding soil to support plant growth;
a sump surrounding the central cavity for holding water to support plant growth;
a lip between the sump and the central cavity on a top side of the sump;
a groove spacing the sump away from an outer surface of the central cavity, wherein the grove receives the lip of a second pot such that the lip nests within the groove; and
a wick extending from the sump into the central cavity for communicating water to soil within the central cavity.

10. The pot as recited in claim 9, wherein a first pot may be nested on the second pot such that a first sump of the first pot is at least partially received within a second sump of the second pot.

11. The pot as recited in claim 9, wherein the sump includes a depth that is less than a depth of the central cavity.

12. The pot as recited in claim 9, wherein a cross-section of the pot comprises a single continuous annular wall defining the central cavity, the sump and the groove disposed between the central cavity and the sump.

* * * * *